United States Patent

Gonzalez

[11] Patent Number: 5,272,817
[45] Date of Patent: Dec. 28, 1993

[54] SIGNAL CONDITIONING CIRCUIT FOR TRIGGER PROBE

[75] Inventor: Louis P. Gonzalez, Dammartin en Goële, France

[73] Assignee: Renishaw Metrology Limited, Gloucestershire, England

[21] Appl. No.: 832,396

[22] Filed: Feb. 7, 1992

[30] Foreign Application Priority Data

Feb. 28, 1991 [FR] France ............... 91 03137

[51] Int. Cl.⁵ ............................. G01B 7/03
[52] U.S. Cl. ........................ 33/561; 33/558
[58] Field of Search ........... 33/556, 558, 559, 561, 33/502, 503; 340/678, 686, 687

[56] References Cited

U.S. PATENT DOCUMENTS

| | | |
|---|---|---|
| 4,153,998 | 5/1979 | McMurtry . |
| 4,177,568 | 12/1979 | Werner et al. ............ 33/DIG. 13 |
| 4,187,362 | 4/1979 | Archer . |
| 4,512,083 | 4/1985 | Schmitt et al. . |
| 4,769,919 | 9/1988 | Lloyd et al. ............. 33/558 |
| 4,785,545 | 11/1988 | Aubele ................ 33/561 |
| 5,024,003 | 6/1991 | Breyer ................ 33/561 |
| 5,084,696 | 1/1992 | Guscott et al. . |
| 5,090,131 | 2/1992 | Deer .................. 33/561 |

FOREIGN PATENT DOCUMENTS

| | | |
|---|---|---|
| 0388993 | 9/1990 | European Pat. Off. . |
| 3634689A1 | 4/1988 | Fed. Rep. of Germany . |
| 2298084 | 8/1976 | France . |
| WO88/01726 | 3/1988 | PCT Int'l Appl. . |
| 2145523A | 3/1985 | United Kingdom . |
| 2197482A | 5/1988 | United Kingdom . |

Primary Examiner—William A. Cuchlinski, Jr.
Assistant Examiner—Alvin Wirthlin
Attorney, Agent, or Firm—Oliff & Berridge

[57] ABSTRACT

A touch trigger probe has electrical contacts. A comparator compares the resistance of the contacts with a threshold, in order to generate a repeatable trigger signal when the contacts open. To ensure that the trigger signal can be generated reliably even if the resistance of the contacts when closed should increase, the threshold set is variable. The threshold can, for example, be set by a sample and hold circuit which tracks the resistance of the contacts when closed.

9 Claims, 2 Drawing Sheets

SIGNAL CONDITIONING CIRCUIT FOR TRIGGER PROBE

BACKGROUND OF THE INVENTION

This invention relates to signal conditioning circuits, which can be used to condition the output of trigger probes. Trigger probes are used for measuring workpieces on position determination apparatus such as coordinate measuring machines or machine tools, and deliver a trigger signal when a position measurement is to be taken.

A known type of such probe is described in U.S. Pat. No. 4,153,998 (McMurtry). It comprises a workpiece-contacting stylus which is biased by a spring into a rest position defined by kinematically arranged seating elements. A normally closed electrical circuit through the kinematic seating elements is opened when the stylus is deflected by contact with a workpiece, and the opening of this electrical circuit is detected to provide a trigger signal indicating contact between the stylus and the workpiece.

In practice, such probes are sold with an interface circuit which monitors the resistance across the kinematic seating elements. The trigger signal is developed at the output of the interface when the resistance across the contacts formed by the seating elements increases above a certain predetermined threshold, as the contacts open. The output signal from the interface reverts to its original state to indicate when the contacts re-close, i.e. when the stylus has correctly reseated in its kinematic seating elements and the resistance across the contacts falls.

The kinematic seating arrangement of the probe ensures that the stylus always returns to an extremely repeatable mechanical rest position, and the interface circuit discussed above ensures that the electrical generation of the trigger signal is also very repeatable. This repeatability ensures that the probe gives highly accurate results when used on position determination apparatus.

Very occasionally, however, a problem is experienced after a probe has been in use for a long time. After the stylus has returned to its rest position, the output of the interface still indicates that the stylus has not correctly reseated in the kinematic seating arrangement. Such a problem has to be rectified before further measurements can be taken. This is especially inconvenient if the probe is being used to take a sequence of measurements automatically, as is nowadays usually the case.

Our investigations of this problem show that the mechanical reseating of the stylus in its kinematically-defined rest position is in general perfectly satisfactory. We have now found that the problem arises, particularly in a probe which has been used for some time, because the resistance across the seating elements when mechanically reseated is no longer zero, but can rise above the threshold which is detected by the interface. The interface is then unable to distinguish between the seated and unseated states of the stylus.

SUMMARY OF THE INVENTION

The present invention provides a signal conditioning circuit for a trigger probe for position determination apparatus, the probe having electrical contacts, the circuit comprising means for monitoring the resistance across the contacts and for generating a trigger signal when the resistance passes through a certain threshold as the contacts are operated, characterized in that the threshold is variable.

BRIEF DESCRIPTION OF THE DRAWINGS

Preferred embodiments of the above invention will now be described by way of example, and with reference to the accompanying drawings, wherein.

DETAILED DESCRIPTION OF PREFERRED EMBODIMENTS

Figure 1:
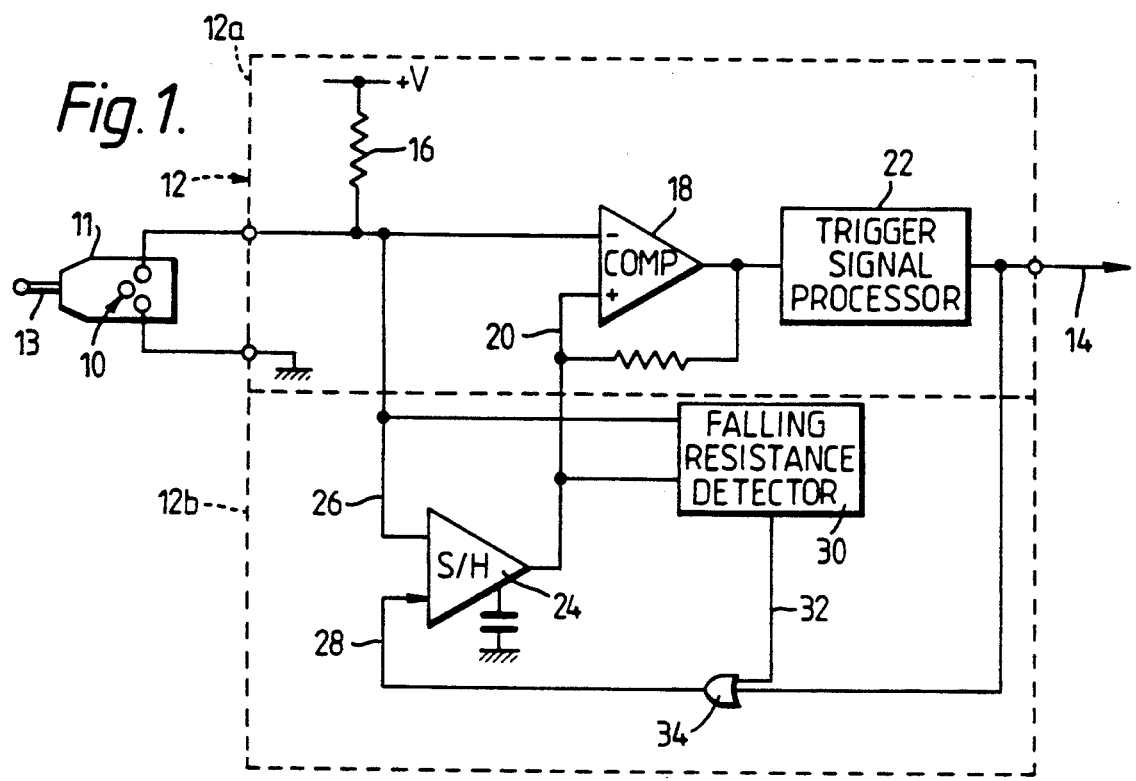
FIG. 1 is a schematic circuit diagram of a first probe interface.

Referring firstly to FIG. 1, a touch trigger probe 11 made in accordance with U.S. Pat. No. 4,153,998 has seating elements 10, forming contacts through which an electrical connection is made. It will be appreciated that in practice such a probe has several (usually three) such sets of contacts, connected in series, and forming a kinematic seating arrangement. The probe is connected to an interface 12, which contains signal conditioning circuitry to produce a trigger signal on an output line 14 when the seating elements 10 open, upon deflection of the stylus 13 of the probe 11. The interface may be provided separately from the probe 11, as shown, or it may be built into the probe.

The interface 12 includes circuitry 12a which is generally conventional, and is found in commercially available interfaces such as that sold by Renishaw Metrology, Wotton-Under-Edge, United Kingdom, under the designation PI4. It will be seen that the contact elements 10 are connected in a voltage divider arrangement with a resistor 16, and the resistance of the contacts 10 is monitored by a comparator 18. The comparator 18 compares the voltage developed across the contact resistance to a threshold voltage on a line 20. In the conventional interface, this threshold voltage is fixed, but in the present embodiment of the invention it is set by circuitry 12b as described below. The parameters of the comparator 18 are set such that its output switches over when the resistance of the contacts 10 exceeds the threshold set on the line 20 by a predetermined amount, e.g. 1.5 kilohms.

Following the comparator 18, the resulting trigger signal is processed by a signal conditioning circuit 22 in a conventional manner, for example to debounce the signal produced when the contacts 10 open. The resulting output on the line 14 is a logical high or low signal, depending whether the contacts 10 are open or closed, and the trigger signal and the subsequent reseating of the stylus are indicated by falling or rising edges respectively.

The variable level of the threshold set on the line 20 is taken from the output of a sample and a hold circuit 24 in the circuitry 12b. The sample and hold circuit 24 has an input voltage on a line 26, indicating the resistance across the contacts 10, and it is triggered by a signal on the line 28, upon which appears the rising edge of the output 14 when the contacts 10 reseat. Thus, every time the stylus and the probe reseat, the sample and hold circuit 24 is triggered by the line 28, and a new threshold value appears on the line 20. The new threshold value corresponds to the resistance through the reseated contacts 10.

Thus, in operation, should the resistance of the contacts 10 be non-zero when the stylus reseats, the comparator 18 will still be able to detect, in a repeatable manner, the increase in resistance which occurs when the stylus is next deflected and the contacts 10 reopen. In effect, the threshold value set on the line 20 tracks the value of the resistance of the contacts 10 when they are reseated.

We have found that when the stylus reseats, closing the contacts 10, the resistance across the reseated contacts may sometimes not settle to a stable value immediately, but may fall gradually over a period of time after the mechanical reseating has taken place. FIG. 1 therefore shows an optional circuit 30 which can be included if desired to take account of this phenomenon. The circuit 30 acts to detect such a falling resistance after reseat, and if such a falling resistance is detected, an output is produced on a line 32. This is gated by an OR-gate 34 with the trigger signal on the output line 14, in order to produce the trigger signal on line 28 for the sample and hold circuit 24. Thus, if the resistance of the reseated contact is falling, the sample and hold circuit 24 resamples the voltage on the line 26, and produces a new threshold value on the line 20. Of course, if the falling resistance detector 30 is omitted, then so also is the OR-gate 34.

The falling resistance detector 30 can be a simple analog comparator, which produces the required output on the line 32 whenever the voltage on line 26 falls below that on line 20 by more than a certain predetermined amount. Alternatively, it may incorporate digital circuitry.

The circuit described above was tested as follows.

Conventionally, a probe is life-tested by connecting it to an interface, and repeatedly triggering it by deflecting the stylus and allowing it to reseat. A probe was selected which had failed such a life-test after 120,000 triggers when connected to a conventional interface, the output of the interface then appearing to indicate that the contacts 10 had failed to reseat. The selected probe was then connected instead to an interface constructed as shown in FIG. 1, and was found to operate satisfactorily. The life-test was continued for a further 500,000 triggers, during which time the performance continued to be satisfactory.

Figure 2:
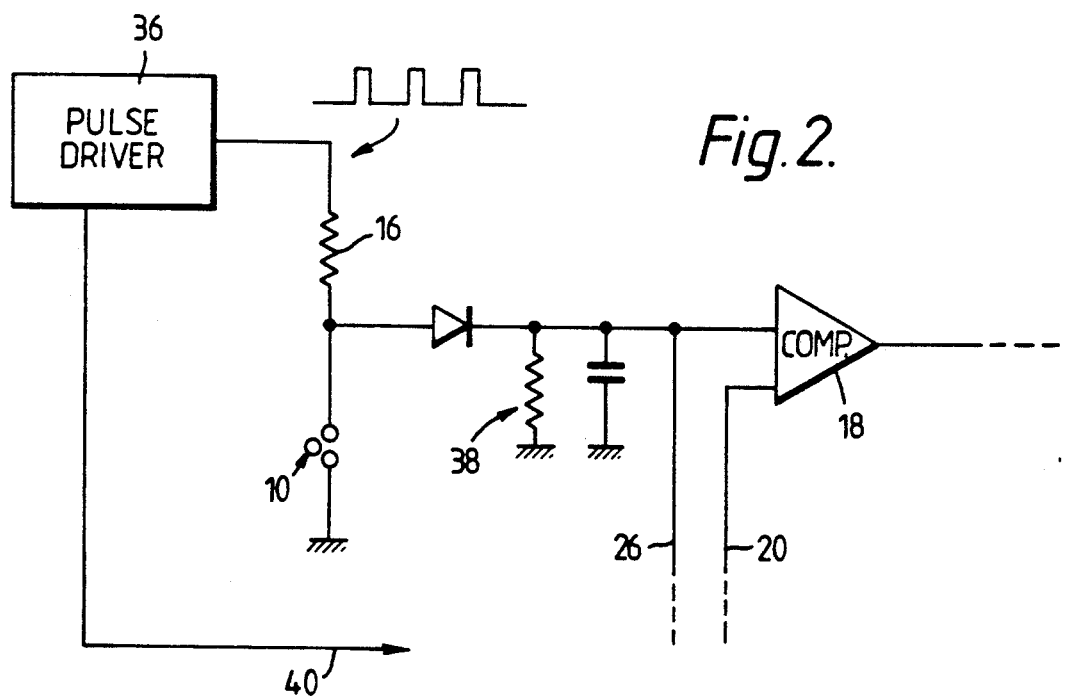
FIG. 2 shows part of the circuit of FIG. 1, incorporating a modification.

FIG. 2 shows a modification. The circuit in FIG. 1 has current continuously flowing through the contacts 10 when reseated, because the resistor 16 is permanently connected to the supply rail +V. In FIG. 2, however, the resistor 16 is connected to the output of a pulse driver circuit 36. The circuit 36 produces a train of pulses each having a width of less than 1 μs, at intervals in excess of 5 μs. Thus, current flows in the contacts 10 for less than one fifth of the time. The voltage developed across the contacts 10 during an individual pulse is processed by the comparator 18 and by the sample and hold circuit 24 (not shown in FIG. 2), via appropriate filter circuitry 38. The circuitry of FIG. 1, especially the sample and hold circuit 24, should be synchronized with the pulses, e.g. using an output 40 of the driver 36.

The modification of FIG. 2 is particularly useful in the case of battery-powered probes, such as are often used on machine tools. Since current flows through the contacts 10 for a much shorter total time, battery consumption is reduced significantly. To maximize the reduction, it is desirable to use a low power oscillator in the pulse driver 36, and to minimize losses due to capacitances in the probe and in any connecting cables. The life of the contacts 10 may also be increased, because the total energy flowing through them is lower.

Figure 3:
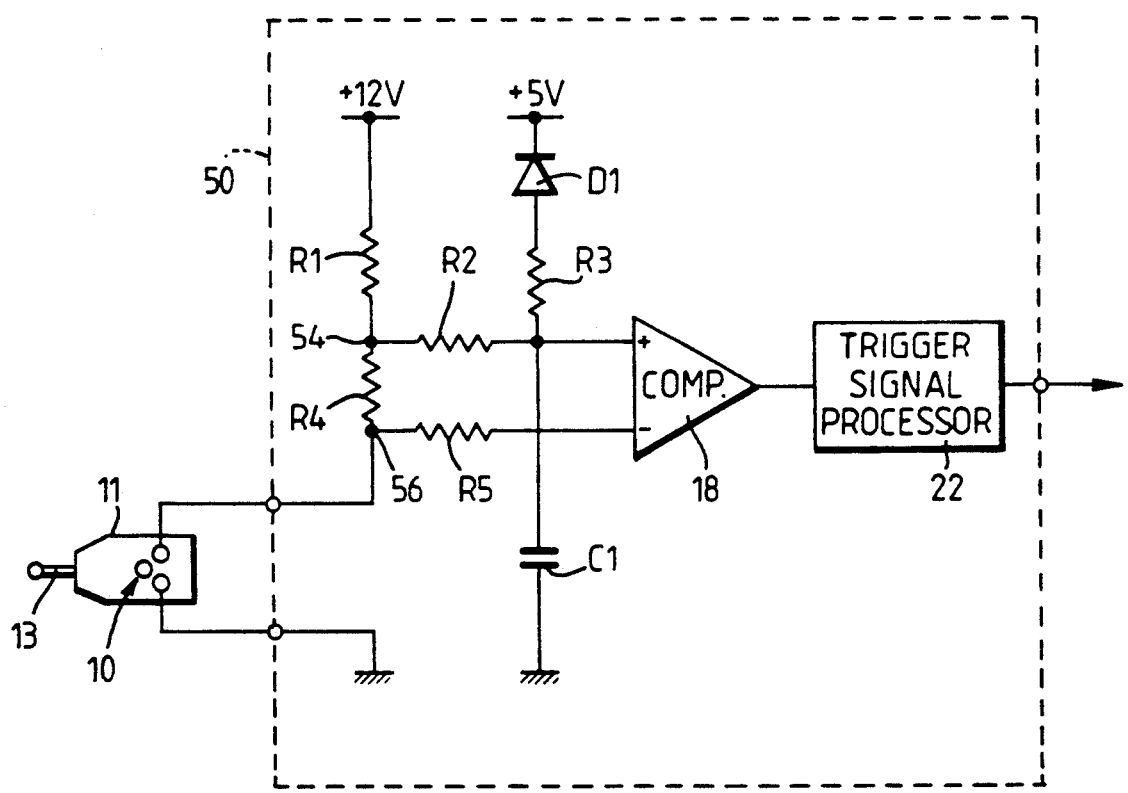
FIG. 3 is a schematic circuit diagram of a second probe interface.

FIG. 3 shows an alternative interface circuit 50, connected to the contacts 10 of the probe 11. Like the circuit of FIG. 1, the circuit 50 includes a comparator 18 which provides a trigger signal as the voltage across the probe contacts 10 increases, when the stylus 13 touches a workpiece and the contacts start to open. The circuit 50 also includes the generally conventional circuitry 22 for processing the trigger signal. However, the circuit 50 differs in the manner in which the trigger threshold is set.

Referring to FIG. 3, the positive and negative inputs of the comparator 18 are respectively connected through resistors R2, R5 to points 54 and 56 in a voltage divider. The divider extends between a +12 volt supply rail and ground, and consists of resistors R1, R4 and the resistance of the contacts 10. Thus, the voltage at the point 54 is always a few volts higher than that at point 56, when the contacts 10 are closed, even if the contacts 10 have some resistance and are not a complete short circuit. A capacitor C1 is connected between the positive input of the comparator 18 and ground, and when the contacts 10 are closed this capacitor is charged to the voltage of the point 54 via the resistor R2.

When the stylus 13 touches a workpiece and the contacts 10 start to open, the voltage at the point 56 immediately starts to rise, and this is fed straight through to the negative input of the comparator 18 via the resistor R5. However, the positive input of the comparator cannot rise immediately, because of the charge on the capacitor C1, and consequently the negative input soon rises to a higher voltage than the positive input, causing the trigger output signal to be generated and passed to the processing circuitry 22. It can therefore be seen that the threshold is set by the voltage on the capacitor C1, derived from the point 54.

After the trigger signal has been generated, of course, the voltage on the capacitor C1 (and thus on the positive input of the comparator) will rise. However, it is prevented from rising too far, because the positive input of the comparator is also connected to a +5 volt supply rail via a diode D1 and resistor R3. Before the generation of the trigger signal, the diode D1 was reverse biased, and consequently the resistor R3 had no effect, but now it acts to clamp the voltage of the positive input of the comparator and prevent it rising above about 8 volts (set by the resistors R1, R2 and R3). The purpose of this clamping is to prevent the positive input of the comparator rising to a higher voltage than the negative input during the time that the probe contacts 10 remain unseated, so that the output of the comparator remains in the triggered state.

When the stylus 13 of the probe reseats, and the contacts 10 re-close, the voltages at the points 54 and 56 fall again, and the output of the comparator 18 reverts to the untriggered condition. The voltage across the capacitor C1 again assumes the value at the point 54. If the resistance across the contacts 10, when closed, is different from previously, the voltages at points 54 and 56 will change correspondingly, and the threshold voltage set on the capacitor C1 will also change. Furthermore, if the resistance across the contacts should fall gradually after reseating, then the threshold set by the capacitor C1 will also fall gradually.

Thus, as in the previous embodiment, the threshold is variable, and always corresponds to a resistance slightly higher than the resistance of the contacts 10 when closed. Should there be a change in the resistance of the contacts 10 when closed, the sudden increase in resistance as the contacts open can nevertheless be detected, which might not be possible with the fixed threshold of the prior art interface circuits.

I claim:

1. A signal conditioning circuit for a trigger probe for a position determination apparatus, the probe having a stylus which is seatable in a rest position in the probe, and at least one pair of electrical contacts that are closed when the stylus is seated, the circuit comprising means for directly monitoring the resistance across said pair of contacts when a voltage is applied thereto and for generating a trigger signal when the resistance passes through a certain threshold as said pair of contacts are operated to open by contact of the stylus with a workpiece, and means for varying said threshold.

2. A circuit according to claim 1, including means for setting said threshold in accordance with the resistance of said contacts when closed.

3. A circuit according to claim 2, wherein said means for setting the threshold includes a voltage divider for connection to said contacts.

4. A circuit according to claim 2, wherein said means for setting the threshold includes a capacitor for holding a voltage corresponding to the threshold.

5. A circuit according to claim 2, wherein said means for setting the threshold comprises a sample and hold circuit.

6. A circuit according to claim 2, wherein the means for setting said threshold is triggered by the closing of said contacts.

7. A circuit according to claim 2, including means for detecting when the resistance of said contacts is falling after they have closed, and for resetting said threshold accordingly.

8. A circuit according to claim 1, including means for passing current through said contacts for only part of the time.

9. A trigger probe for a position determination apparatus, the probe having a stylus which is seatable in a rest position in the probe, and at least one pair of electrical contacts that are closed when the stylus is seated, means for operating said pair of contacts when the stylus contacts a workpiece and a signal conditioning circuit connected to said pair of contacts, the circuit comprising means for directly monitoring the resistance across said pair of contacts when a voltage is applied thereto and for generating a trigger signal when the resistance passes through a certain threshold as said pair of contacts are operated to open by contact of the stylus with the workpiece, and means for varying said threshold.

* * * * *